United States Patent
Zhu et al.

(10) Patent No.: US 11,251,460 B2
(45) Date of Patent: Feb. 15, 2022

(54) SOLUTION-PROCESSED SOLID-STATE ELECTROLYTE AND METHOD OF MANUFACTURE THEREOF

(71) Applicants: SAMSUNG ELECTRONICS CO., LTD., Suwon-Si (KR); MASSACHUSETTS INSTITUTE OF TECHNOLOGY, Cambridge, MA (US)

(72) Inventors: Yuntong Zhu, Cambridge, MA (US); Zachary Hood, Atlanta, GA (US); Jennifer Rupp, Cambridge, MA (US); Lincoln J. Miara, Lincoln, MA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 100 days.

(21) Appl. No.: 16/225,068

(22) Filed: Dec. 19, 2018

(65) Prior Publication Data

US 2020/0044282 A1 Feb. 6, 2020

Related U.S. Application Data

(60) Provisional application No. 62/713,428, filed on Aug. 1, 2018.

(51) Int. Cl.
*H01M 10/0562* (2010.01)
*H01M 10/058* (2010.01)
*H01M 10/052* (2010.01)

(52) U.S. Cl.
CPC ..... *H01M 10/0562* (2013.01); *H01M 10/052* (2013.01); *H01M 10/058* (2013.01); *H01M 2300/0077* (2013.01)

(58) Field of Classification Search
CPC ......... H01M 10/0568; H01M 10/0562; H01M 10/0561
See application file for complete search history.

(56) References Cited

U.S. PATENT DOCUMENTS 6,884,514 B2 4/2005 Simpson et al.
7,901,658 B2 3/2011 Weppner et al.
(Continued)

FOREIGN PATENT DOCUMENTS

CN 105406118 A 3/2016
CN 106374085 A 2/2017
(Continued)

OTHER PUBLICATIONS

NIST URL: https://www.nist.gov/pml/weights-and-measures/si-units-temperature (Year: 2010).*
(Continued)

*Primary Examiner* — Nathanael T Zemui
(74) *Attorney, Agent, or Firm* — Cantor Colburn LLP

(57) ABSTRACT

A method of manufacturing a solid-state electrolyte, the method including: providing a substrate; providing a precursor composition including a compound including a compound including lithium, a compound including lanthanum, and a compound including zirconium, and a solvent; disposing the precursor composition on the substrate to provide a coated substrate; treating the coated substrate at a temperature between −40° C. and 25° C. to form a precursor film on the substrate; and heat-treating the precursor film at a temperature of 500° C. to 1000° C. to manufacture the solid-state electrolyte, wherein the solid-state electrolyte includes $Li_{(7-x)}Al_{x/3}La_3Zr_2O_{12}$ wherein $0 \leq x \leq 1$, and wherein the solid-state electrolyte in the form of a film having a thickness of 5 nanometers to 1000 micrometers.

16 Claims, 9 Drawing Sheets

(56) References Cited

U.S. PATENT DOCUMENTS

| | | | |
|---|---|---|---|
| 8,658,317 | B2 | 2/2014 | Weppner et al. |
| 9,093,717 | B2 | 7/2015 | Sakamoto et al. |
| 9,450,271 | B2 | 9/2016 | Weppner et al. |
| 10,008,742 | B2 | 6/2018 | Holme et al. |
| 2015/0111110 | A1* | 4/2015 | Watanabe ............. H01B 1/08 429/304 |
| 2015/0200420 | A1* | 7/2015 | Holme ............. C04B 41/5027 429/322 |
| 2016/0056500 | A1 | 2/2016 | Holme et al. |
| 2016/0133990 | A1 | 5/2016 | Schwanz et al. |
| 2016/0141108 | A1 | 5/2016 | Inahara |
| 2017/0363928 | A1 | 12/2017 | Cloots et al. |
| 2018/0026299 | A1 | 1/2018 | Son et al. |
| 2018/0138546 | A1* | 5/2018 | Sung ............. H01M 10/052 |
| 2018/0175446 | A1 | 6/2018 | Nishizaki et al. |
| 2018/0309136 | A1 | 10/2018 | Vieluf et al. |
| 2018/0375151 | A1 | 12/2018 | Gaben et al. |
| 2019/0245178 | A1* | 8/2019 | Cao ............. H01M 10/0525 |
| 2020/0044281 | A1 | 2/2020 | Zhu et al. |
| 2020/0403269 | A1 | 12/2020 | Zhu et al. |

FOREIGN PATENT DOCUMENTS

| | | |
|---|---|---|
| JP | 2014002965 A | 1/2014 |
| WO | 2018089430 A1 | 5/2018 |

OTHER PUBLICATIONS

Ashby, D., et al., "Patternable, Solution-Processed Ionogels for Thin-Film Lithium-Ion Electrolytes," Joule, 1, Oct. 11, 2017, pp. 344-358.

Bitzer, M., et al., "Sol-gel synthesis of thin solid Li7La3Zr2O12 electrolyte films for Li-ion batteries," Thin Solid Films, 615 (2016), pp. 128-134.

Chen, C.H., et al., "Electrode and solid electrolyte thin films for secondary lithium-ion batteries," Journal of Power Sources, 68 (1997), pp. 377-380.

Chen, R-J, et al., "Sol-gel derived Li—La—Zr—O thin films as solid electrolytes for lithium-ion batteries," J. Mater. Chem. A, 2014, 2, pp. 13277-13282.

Djenadic, R., et al., "Nebulized spray pyrolysis of Al-doped Li7La3Zr2O12 solid electrolyte for battery applications," Solid State Ionics, 263, 2014, pp. 49-56.

Garbayo, I., et al., "Glass-Type Polyamorphism in Li-Garnet Thin Film Solid State Battery Conductors," Adv. Energy Mater., 2018, 8, 1702265 (14 pages).

Huang, X., et al., "Method Using Water-Based Solvent to Prepare Li7La3Zr2O12 Solid Electrolytes," ACS Appl. Mater. Interfaces 2018,10, pp. 17147-17155.

Kazyak, E., et al., "Atomic Layer Deposition of the Solid Electrolyte Garnet Li7La3Zr2O12," Chem. Mater., 2017, 29, pp. 3785-3792.

Lee, G., et al., "Fabrication of a stretchable and patchable array of high performance micro-supercapacitors using a non-aqueous solvent based gel electrolyte," Energy Environ. Sci., 2015, 8, pp. 1764-1774.

Rawlence, M., et al., "Effect of Gallium Substitution on Lithium-Ion Conductivity and Phase Evolution in Sputtered Li7-3xGaxLa3Zr2O12 Thin Film," ACS Appl. Mater. Interfaces, 2018, 10, pp. 13720-13728.

Solano, M., "Development of artificial surface layers for thin film cathode materials,"Material chemistry, Université de Bordeaux, 2015, English, submitted on Jun. 7, 2016, 160 pages.

Van Den Broek, J., et al., "Boosting the electrochemical performance of Li-garnet based all-solid-state batteries with Li4Ti5O12 electrode: Routes to cheap and large scale ceramic processing," J Electroceram (2017), 38, pp. 182-188.

Wang, B., et al., "Sol-gel-derived amperometric biosensor for hydrogen peroxide based on methylene green incorporated in Nafion film," Talanta, 51 (2000), pp. 565-572.

U.S. Non Final Office Action issued for U.S. Appl. No. 16/224,968, filed Dec. 19, 2018; dated Feb. 3, 2021; 29 pages.

U.S. Final Office Action issued for U.S. Appl. No. 16/224,968, filed Dec. 19, 2018; dated Jun. 28, 2021; 17 pages.

* cited by examiner

SOLUTION-PROCESSED SOLID-STATE ELECTROLYTE AND METHOD OF MANUFACTURE THEREOF

CROSS-REFERENCE TO RELATED APPLICATION

This application claims priority to U.S. Provisional Patent Application No. 62/713,428, filed on Aug. 1, 2018, in the United States Patent and Trademark Office, and all the benefits accruing therefrom under 35 U.S.C. § 119, the content of which is incorporated herein in its entirety by reference.

BACKGROUND

1. Field

Disclosed is a solid-state lithium-ion conductor, a method of making the solid-state lithium-ion conductor, and a lithium battery including the same.

2. Description of the Related Art

A battery including a solid-state electrolyte can potentially offer improved safety, and in some configurations provide improved specific energy and energy density. Garnet-type oxides can provide promising lithium-ion conductivity. It would thus be desirable to use a garnet-type oxide electrolyte in a solid-state lithium-ion battery. However, there remains a need for a scalable method of manufacture of a garnet-type electrolyte in a suitable form which also provides suitable lithium-ion conductivity.

SUMMARY

Disclosed is a method of manufacturing a solid-state electrolyte including: providing a substrate; providing a precursor composition including a compound including lithium, a compound including lanthanum, and a compound including zirconium, and a solvent; disposing the precursor composition on the substrate to provide a coated substrate; treating the coated substrate at a temperature between −40° C. and 25° C. to form a precursor film on the substrate; and heat-treating the precursor film at a temperature of 500° C. to 1000° C. to manufacture the solid-state electrolyte, wherein the solid-state electrolyte includes $Li_{(7-x)}Al_{x/3}La_3Zr_2O_{12}$ wherein $0 \leq x \leq 1$, and wherein the solid-state electrolyte in the form of a film having a thickness of 5 nanometers to 1000 micrometers.

Also disclosed is a solid state electrolyte including $Li_{(7-x)}Al_{x/3}La_3Zr_2O_{12}$ wherein $0 \leq x \leq 1$, wherein the solid state electrolyte is in a form of a film having a thickness of 5 nanometers to 1000 micrometers, and wherein a defect content of the film is 0 to 20 percent, based on a total area of the film.

Also disclosed is a lithium battery including the solid-state electrolyte in at least one of the positive electrode, the separator, or the negative electrode.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Lithium lanthanum zirconium oxide (LLZO) garnet-type solid-state electrolytes are currently synthesized by bulk-type methods, e.g., sintering a pressed pellet, or sintering a compressed tape. The products of the bulk-type methods can have desirable conductivity, however the processing methods, while suitable for laboratory setting, are difficult to economically implement in a manufacturing environment. Alternatively, methods to provide thin-films of LLZO by vacuum techniques are known, however such methods are economically unsuitable for scalable production.

Disclosed is a method of manufacturing a solid-state electrolyte comprising: providing a substrate; providing a precursor composition comprising a compound comprising lithium, a compound comprising lanthanum, and a compound comprising zirconium, and a solvent; disposing the precursor composition on the substrate to provide a coated substrate; treating the coated substrate at a temperature between −40° C. and 25° C. to form a precursor film on the substrate; and heat-treating the precursor film at a temperature of 500° C. to 1000° C. to manufacture the solid-state electrolyte, wherein the solid-state electrolyte comprises $Li_{(7-x)}Al_{x/3}La_3Zr_2O_{12}$ wherein $0 \leq x \leq 1$, and wherein the solid-state electrolyte in the form of a film having a thickness of 5 nanometers to 1000 micrometers. The disclosed method provides films having a selected thickness, desirable conductivity, and selective surface morphology. Also, the disclosed method is scalable and can have a cost which is suitable for a manufacturing environment.

Figure 1:
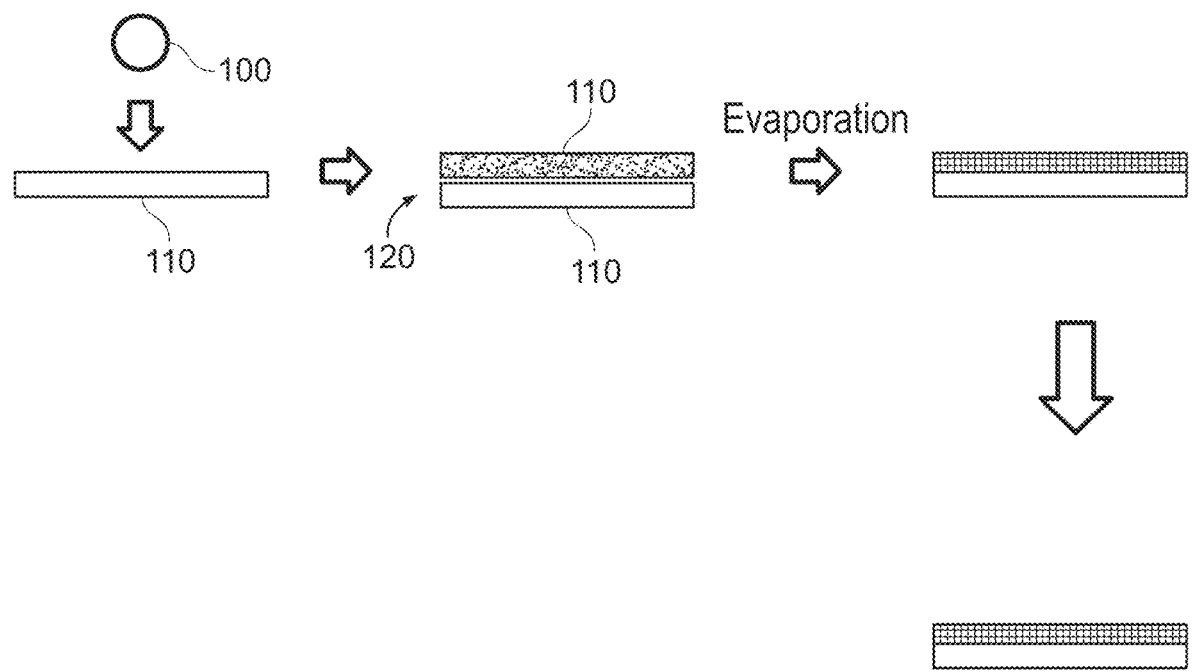
FIG. 1 is a schematic diagram of an embodiment of a method of manufacturing a solid-state electrolyte.

A schematic diagram of the disclosed method is provided in FIG. 1. In the disclosed method, a film of a precursor composition 100 is first formed on a substrate 110 to form a coated substrate 120 comprising the substrate 110 having the precursor composition 100 thereon. A solvent of the precursor composition is then removed, e.g., by evaporation, sublimation, or a combination thereof, by treatment of the coated substrate at a temperature of −40° C. and 25° C. to form a precursor film 130 on the substrate. The precursor film 130 is then heat-treated at 500° C. to 1000° C. to manufacture the solid-state electrolyte 140. As is further disclosed herein, the method provides a film of the garnet-type solid-state electrolyte with selected thickness, reduced defect content, selected surface roughness, and a desirable content of the desirable cubic $Li_{(7-x)}Al_{x/3}La_3Zr_2O_{12}$ (c-LLZO) phase.

The substrate may comprise any suitable material, and may comprise an oxide, carbide, nitride, a metal, or a combination thereof. A substrate comprising an aluminum oxide comprising iron, titanium, chromium, copper, magnesium, or a combination thereof, MgO, $Al_2O_3$, $SiO_2$, indium tin oxide, zinc oxide, indium tin zinc oxide, SiC, Ti, Ni, stainless steel, or combination thereof is disclosed. Use of MgO is mentioned.

The precursor composition comprises a compound comprising lithium, a compound comprising lanthanum, and a compound comprising zirconium, and may further comprise a compound comprising aluminum. Suitable compounds for the precursor include an oxide, hydroxide, nitrate, carbonate, oxalate, peroxide, acetate, acetylacetonate, or a combination thereof. The precursor may comprise lithium, lanthanum, zirconium, and optionally aluminum. In an embodiment, the precursor comprises a plurality of lithium, lanthanum, zirconium, and optionally aluminum.

Representative precursor compounds comprising lithium include lithium oxide, lithium hydroxide, lithium nitrate, lithium carbonate, lithium oxalate, lithium peroxide, lithium acetate, lithium acetoacetate, or a combination thereof.

Representative precursor compounds comprising lanthanum include lanthanum oxide, lanthanum hydroxide, lanthanum nitrate, lanthanum carbonate, lanthanum oxalate, lanthanum peroxide, lanthanum acetate, lanthanum acetoacetate, or a combination thereof.

Representative precursor compounds comprising zirconium include zirconium oxide, zirconium hydroxide, zirconium nitrate, zirconium carbonate, zirconium oxalate, zirconium peroxide, zirconium acetate, zirconium acetoacetate, or a combination thereof.

Representative precursor compounds comprising aluminum include aluminum oxide, aluminum hydroxide, aluminum nitrate, aluminum carbonate, aluminum oxalate, aluminum peroxide, aluminum acetate, aluminum acetoacetate, or a combination thereof.

Also disclosed are precursor compounds that provide a combination of lithium, lanthanum, or zirconium, and optionally aluminum, e.g., a nitrate comprising a combination of lithium, lanthanum, or zirconium, and optionally aluminum.

If desired, the precursor compound may be a hydrate. For example, use of $La(NO_3)_3 \cdot 6H_2O$ or $Al(NO_3)_3 \cdot 9H_2O$ is mentioned.

The precursor composition for forming the solid-state electrolyte may be a solution, a suspension, or a combination thereof of the precursor compound in the solvent. In an embodiment, the precursor composition is a solution of the precursor compound in the solvent. Also a suspension is disclosed. In an embodiment, at least one of the compound comprising lithium, the compound comprising lanthanum, and the compound comprising zirconium is not fully dissolved in the solvent to provide a suspension.

The precursor composition may comprise a stoichiometric excess of the compound comprising lithium, based on a stoichiometry for $Li_{(7-x)}Al_{x/3}La_3Zr_2O_{12}$ wherein $0 \leq x \leq 1$. The stoichiometric excess of the compound comprising lithium may be 10% to 400%, 20% to 350%, or 40% to 300%, based on a stoichiometry for $Li_{(7-x)}Al_{x/3}La_3Zr_2O_{12}$ wherein $0 \leq x \leq 1$. Use of a stoichiometric of 250% for the compound comprising lithium, corresponding to $Li_{22}$ in $Li_{(7-x)}Al_{x/3}La_3Zr_2O_{12}$, in the precursor solution is mentioned.

The solvent may comprise a substituted or unsubstituted C1 to C20 alcohol, a substituted or unsubstituted C1 to C20 ester, a substituted or unsubstituted C2 to C20 carbonate, a substituted or unsubstituted C1 to C20 ketone, water, or a combination thereof.

Use of a substituted or unsubstituted alcohol, a substituted or unsubstituted ester, a substituted or unsubstituted carbonate, a substituted or unsubstituted ketone, or a combination thereof is mentioned. In an embodiment, the solvent comprises a substituted or unsubstituted C1 to C6 alcohol. Use of methanol is mentioned. In an embodiment, disclosed is a composition for forming the solid-state electrolyte comprising a solution of the starting materials in methanol.

A boiling point of the solvent can be 0° C. to 150° C., 5° C. to 125° C., 10° C. to 100° C., or 20° C. to 80° C. In an embodiment, the solvent has a boiling point between 20° C. and 90° C.

The concentration of the precursor compound in the solvent may be a concentration which is suitable for casting. In an embodiment, the concentration of the precursor compound in the solvent is 0.001 to 1 molar (M), 0.005 to 0.5 M, or 0.01 to 0.1 M. Use of a precursor concentration of 0.02 to 0.08 M is mentioned.

In the disclosed method the precursor composition is disposed on the substrate to provide a coated substrate. The precursor composition may be disposed on the substrate by any suitable method, including casting, coating, or spraying, e.g., gap coating, gravure coating, dip coating, immersion coating, kiss coating, metering rod coating, roll coating, screen coating, slot die coating, extrusion coating, or curtain coating. An amount of the precursor composition disposed on the substrate may be 0.001 to 100 grams per square meter ($g/m^2$), 0.01 to 50 $g/m^2$, or 0.1 to 25 $g/m^2$. A thickness of the precursor composition on the substrate prior to further treating the coated substrate may be 0.01 to 1000 micrometers (μm), 0.05 to 500 μm, or 0.1 to 100 μm.

The coated substrate is treated at a temperature between −40° C. and 25° C. to form a precursor film on the substrate. While not wanting to be bound by theory, it is understood that treating the coated substrate at a temperature at or below room temperature, i.e., between −40° C. and 25° C., results in reduced thermal contraction and reduced stress in the resulting precursor film. The reduced stress is understood to result from a reduced evaporation rate. In an embodiment, the treating the coated substrate at −30° C. to 20° C., −20° C. to 15° C., −10° C. to 10° C., or 0° C. to 5° C. Also, the treating may be performed for 0.01 to 24 hours, 0.05 to 20 hours, or 0.1 to 10 hours. Treating at 0 to 10° C. for 6 to 12 hours is mentioned.

A content of the solvent in the precursor film 130 can be 0.001 to 20 weight percent (wt %), 0.005 to 10 wt %, or 0.01 to 5 wt %, based on a total weight of the precursor film. A precursor film comprising 0.1 to 3 wt % of the solvent, based on a total weight of the precursor film, is mentioned.

Optionally, the precursor film may undergo a stress-relieving step prior to heat-treating. The stress-relieving may comprise allowing the precursor film to thermally equilibrate at 0° C. to 25° C., 5° C. to 22° C., or 10° C. to 20° C. Also, the stress-relieving may comprise allowing the precursor film to thermally equilibrate for 0.01 to 24 hours, 0.05 to 20 hours, or 0.1 to 10 hours. Thermally equilibrating at 10° C. to 20° C. for 0.1 to 10 hours is mentioned.

The precursor film is then heat-treated at 500° C. to 1000° C., 550° C. to 900° C., or 600° C. to 800° C., to manufacture the solid-state electrolyte. The heat-treating may comprise heat-treating for 0.01 to 24 hours, 0.05 to 20 hours, or 0.1 to 10 hours. Heat-treating at 700 to 800° C. for 0.05 to 0.25 hours is mentioned.

The heat-treatment can be conducted in any suitable atmosphere. Heat-treatment in air or oxygen ($O_2$) is mentioned. In an embodiment the heat-treatment is conducted in a gas comprising oxygen at a content greater than that in air, e.g., a gas comprising 21% to 100%, 25% to 90%, or 30% to 80% oxygen, based on a total volume of the gas.

The product solid-state electrolyte can be represented by the formula $Li_{(7-x)}Al_{x/3}La_3Zr_2O_{12}$ wherein $0 \leq x \leq 1$. In an embodiment, $0 < x \leq 1$, $0 < x < 1$, $0.1 < x < 0.9$, or $0.2 < x < 0.8$. An embodiment in which x is 0.75 to provide $Li_{6.25}Al_{0.25}La_3Zr_2O_{12}$ is mentioned.

A feature of the disclosed method is that a film of the solid-state electrolyte having a suitable thickness can be provided. A thickness of the film can be 5 nanometers (nm) to 1000 micrometers (μm), 10 nm to 500 μm, or 0.1 to 250 μm.

A feature of the disclosed method is that a film of the solid-state electrolyte having a suitable surface roughness can be provided. The solid-state electrolyte can have a surface roughness of 1 nanometer (nm) to 100 micrometers (μm) Ra, 5 nm to 50 μm Ra, or 10 nm to 1 μm Ra. Surface roughness can be determined using a commercially available surface profiler, such as a Dektak profilometer, or by scanning electron microscopy, for example.

Cubic, tetragonal, and amorphous $Li_{(7-x)}Al_{x/3}La_3Zr_2O_{12}$ can be provided by the disclosed method. Because cubic $Li_{(7-x)}Al_{x/3}La_3Zr_2O_{12}$ provides improved ionic conductivity, cubic $Li_{(7-x)}Al_{x/3}La_3Zr_2O_{12}$ is for many applications desirable. A feature of the disclosed method is that the solid-state electrolyte comprises a desirable content of cubic $Li_{(7-x)}Al_{x/3}La_3Zr_2O_{12}$. While not wanting to be bound by theory, it is understood that cubic $Li_{(7-x)}Al_{x/3}La_3Zr_2O_{12}$ provides improved ionic conductivity relative to other polymorphs. In an embodiment the solid-state electrolyte comprises 20 to 100 wt %, 30 to 98 wt %, 40 to 90 wt %, or 50 to 85 wt % of cubic $Li_{(7-x)}Al_{x/3}La_3Zr_2O_{12}$, based on a total weight of the solid-state electrolyte. In an embodiment, the solid-state electrolyte comprises 1 to 50 wt %, 2 to 40 wt %, or 3 to 30 wt % of tetragonal $Li_{(7-x)}Al_{x/3}La_3Zr_2O_{12}$, based on a total weight of the solid-state electrolyte.

In an embodiment, a content of the cubic $Li_{(7-x)}Al_{x/3}La_3Zr_2O_{12}$ is 50 to 100 weight percent (wt %), a content of the tetragonal $Li_{(7-x)}Al_{x/3}La_3Zr_2O_{12}$ is 0 to 50 wt %, and a content of the amorphous $Li_{(7-x)}Al_{x/3}La_3Zr_2O_{12}$ is 0 to 100 wt %, each based on a total content of the solid-state electrolyte. In an embodiment, a content of the cubic $Li_{(7-x)}Al_{x/3}La_3Zr_2O_{12}$ is 60 to 99 wt %, a content of the tetragonal $Li_{(7-x)}Al_{x/3}La_3Zr_2O_{12}$ is 1 to 50 wt %, and a content of the amorphous $Li_{(7-x)}Al_{x/3}La_3Zr_2O_{12}$ is 1 to 99 wt %, each based on a total content of the solid-state electrolyte. In yet another embodiment, a content of the cubic $Li_{(7-x)}Al_{x/3}La_3Zr_2O_{12}$ is 70 to 95 wt %, a content of the tetragonal $Li_{(7-x)}Al_{x/3}La_3Zr_2O_{12}$ is 0 to 50 wt %, and a content of the amorphous $Li_{(7-x)}Al_{x/3}La_3Zr_2O_{12}$ is 10 to 30 wt %, each based on a total content of the solid-state electrolyte. An embodiment in which a content of the cubic $Li_{(7-x)}Al_{x/3}La_3Zr_2O_{12}$ in the solid-state electrolyte is 80 to 100 wt %, based on a total weight of the solid-state electrolyte, is mentioned.

A feature of the film of the solid-state electrolyte is improved defect content, wherein a defect is considered to be a portion of the film, measured on an areal basis, not comprising the solid-state electrolyte. A defect may be in the form of crack or pin-hole, for example. Defect content can be determined optically, for example by optical measurement of an area of the solid-state electrolyte film missing the solid-state electrolyte. In an embodiment, the solid-state electrolyte has a defect content of 0 to 20 percent (%), 0.001 to 10%, 0.01 to 5%, or 0.1 to 2%, based on a total area of the solid-state electrolyte.

The solid-state electrolyte may have a porosity of 0 to 10%, 0.1 to 8%, or 0.2 to 4%, based on a total volume of the solid-state electrolyte. Embodiment in which the porosity is 0 to 0.2%, based on a total volume of the solid-state electrolyte is mentioned. The porosity may be determined by scanning electron microscopy, the details of which can be determined by one of skill in the art without undue experimentation.

Figure 2:
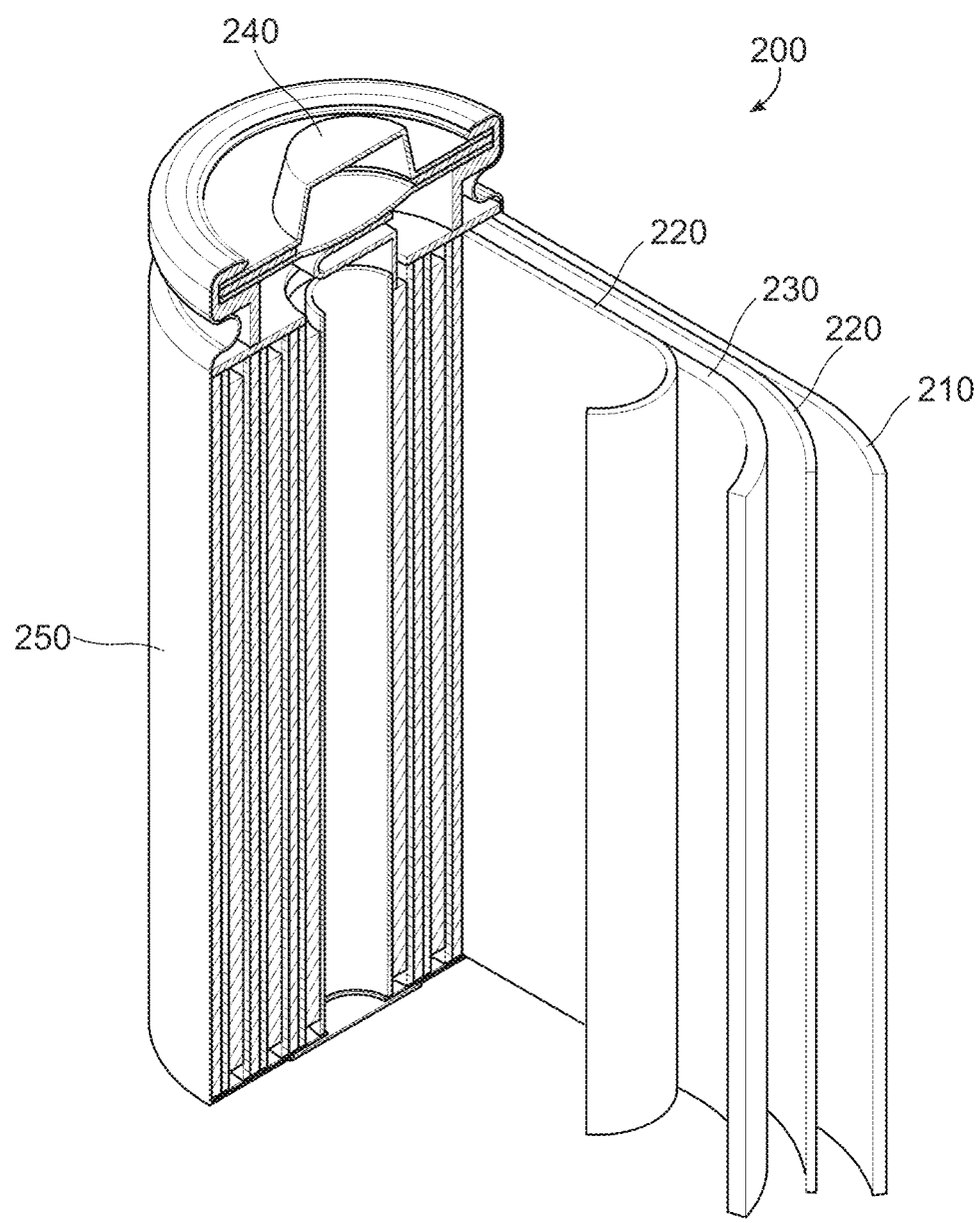
FIG. 2 is a schematic diagram of an embodiment of a lithium battery.

Also disclosed is a lithium battery comprising the solid-state electrolyte in at least one of a positive electrode, a separator, or a negative electrode. As shown in the electrochemical cell 200 of FIG. 2, the negative electrode 210 can be used in combination with a positive electrode 230 comprising the positive active material and a separator 220, e.g., a separator comprising the solid-state electrolyte, provided between the positive electrode and the negative electrode. Also shown in FIG. 2 is a header 240 on a can 250.

Figure 3:
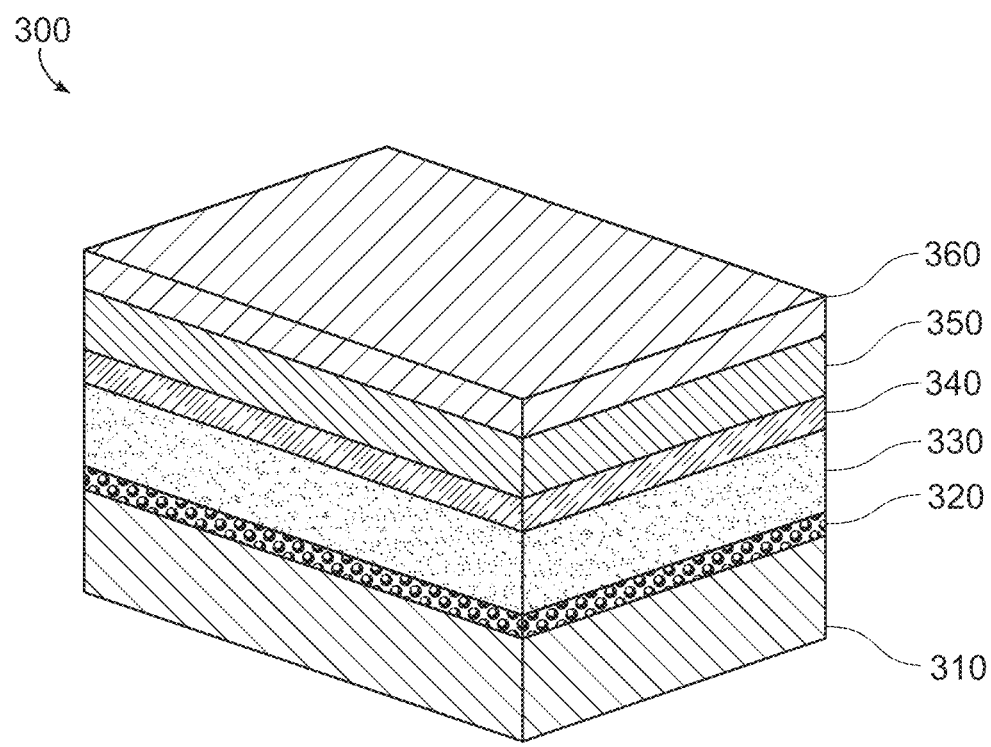
FIG. 3 is a schematic diagram of an embodiment of a lithium battery.

In another embodiment as shown in FIG. 3, an electrochemical cell 300 may comprise a porous separator 330 on the solid-state electrolyte 340. Shown in FIG. 3 is a positive electrode current collector 310, a positive electrode 320 comprising a positive electrode active material and a liquid electrolyte, a porous separator 330, the solid-state electrolyte 340, a negative electrode 350, and a negative electrode current collector 360.

The positive electrode can be prepared by forming a positive active material layer including a positive active material on a current collector. The current collector may comprise aluminum, for example.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Co_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2GbO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0<x<1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$.

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive active material layer may be prepared by screen printing, slurry casting, or powder compression. However, the solid-state method is not limited thereto, and any suitable method may be used. The current collector may comprise aluminum, for example.

The positive electrode can further comprise an electrolyte. When present, the electrolyte can comprise a solid-state electrolyte, a liquid electrolyte, a polymeric electrolyte, or a combination thereof. The liquid electrolyte may comprise a lithium salt and a solvent. Representative lithium salts include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof. The solvent may comprise a carbonate, an ester, an ether, a ketone, an alcohol, or a combination thereof. The carbonate may be linear or cyclic, and may be fluorinated. Representative carbonates include at least one selected from diethyl carbonate ("DEC"), dimethyl carbonate ("DMC"), dipropyl carbonate ("DPC"), methyl propyl carbonate ("MPC"), ethyl propyl carbonate ("EPC"), methyl ethyl carbonate ("MEC"), or a combination thereof, and the cyclic carbonate compound may be, for example, ethylene carbonate ("EC"), propylene carbonate ("PC"), butylene carbonate ("BC"), vinyl ethylene carbonate ("VEC"), fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methyl ethyl ene carbonate, 4-fluoro-4-m ethylethyl ene carbonate, 4,5-difluoro-4-methyl ethylene carbonate, 4,4,5-trifluoro-5-methylethylene carbonate, and trifluoromethyl ethylene carbonate. Representative esters include at least one selected from methyl acetate, ethyl acetate, n-propyl acetate, dimethyl acetate, methyl propionate, ethyl propionate, γ-butyrolactone, decanolide, valerolactone, mevalonolactone, caprolactone, and methyl formate. Representative ethers include at least one selected from dibutyl ether, tetraglyme, diglyme, 1,2-dimethoxy ethane, 1,2-diethoxy ethane, ethoxy methoxy ethane, 2-methyl tetrahydrofuran, and tetrahydrofuran. A representative ketone is cyclohexanone. Representative alcohols include methanol, ethanol, isopropanol, and butanol. The solvent may comprise a nitrile, such as a C1 to C20 nitrile; an amide such as formamide or dimethyl formamide; a dioxolane such as 1,2-dioxolane or 1,3-dioxolane; a sulfolane such as dimethyl sulfoxide, sulfolane, or methyl sulfolane; 1,3-dimethyl-2-imidazolinone; N-methyl-2-pyrrolidinone; nitromethane; trimethyl phosphate; triethyl phosphate; trioctyl phosphate; or triester phosphate. A concentration of the salt in the solvent may be 0.1 to 2 molar (M), e.g., 0.5 to 1.5 M.

The polymeric electrolyte may comprise an ionically conductive polymer. Exemplary ionically conductive polymers can include but are not limited to polyethylene oxide, polyethylene oxide comprising a metal salt, poly(methyl (meth)acrylate), polypropylene oxide, polyvinylidene fluoride, polystyrene, polyvinyl chloride, polyvinyl alcohol, polyacrylonitrile, polyester sulfide, or a combination thereof. The ionically conductive polymer can optionally further comprise a lithium salt, for example LiN $(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof. In some embodiments, the ionically conductive polymer comprises the lithium salt, and is preferably a polyethylene oxide comprising the lithium salt.

The separator may be included between the positive electrode and negative electrode. In an embodiment the separator consists of the solid-state electrolyte. In an embodiment the separator comprises a glass fiber, polyester, polyethylene, polypropylene, polytetrafluoroethylene (PTFE), or a combination thereof. In an embodiment the separator may comprise a microporous polymeric film, such as a microporous polyethylene or microporous polypropylene film. In an embodiment the separator comprises the solid-state electrolyte and a porous olefin film such as polyethylene and polypropylene. A diameter of a pore of the porous olefin film can be 0.01 to 10 micrometers (μm), and a thickness of the separator can be 5 to 300 μm.

In an embodiment, the electrochemical cell comprises the porous separator 330 on the solid-state electrolyte 340. For example, the electrochemical cell may comprise a porous separator 330 comprising a microporous polyethylene film having a pore size of 1 to 50 µm, 2 to 40 µm, or 5 to 30 µm, and a layer of the solid-state electrolyte 340 on the porous separator. The solid-state electrolyte may be liquid-impermeable, may be non-porous, or may have a pore size of 0.01 to 1 µm, or 0.05 to 0.5 µm.

The negative electrode can be produced from a negative active material composition including a negative active material, and optionally, a conductive agent, and a binder. A suitable negative active material includes a material capable of storing and releasing lithium ions electrochemically. The negative electrode active material can comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, Ge, or a combination thereof. Lithium-containing metal oxides, metal nitrides, and metal sulfides are also useful, in particular wherein metal can be Ti, Mo, Sn, Fe, Sb, Co, V, or a combination thereof. Also useable are phosphorous (P) or metal doped phosphorous (e.g., $NiP_3$). The negative active material is not limited to the foregoing and any suitable negative active material can be used. In an embodiment the negative active material is disposed on a current collector, such as copper current collector.

In an embodiment, the negative electrode comprises graphite. In an embodiment, the negative electrode comprises lithium metal or a lithium metal alloy. Use of lithium metal is mentioned.

The electrochemical cell can be made by a method comprising disposing the solid-state electrolyte film between a positive electrode and a negative electrode and inserting the assembly into a can, for example, to provide the electrochemical cell.

Hereinafter an embodiment is described in detail. The examples are provided for illustrative purposes only and are not intended to limit the scope of the present disclosure.

EXAMPLES

Example 1. Preparation of $Li_{6.25}Al_{0.25}La_3Zr_2O_{12}$ on MgO, 630° C.

All chemicals can be used as received without further purification. $LiNO_3$ (≥99%), and Zirconium(IV) acetylacetonate (97%) were purchased from SIGMA-ALDRICH; $Al(NO_3)_3 \cdot 9H_2O$ and $La(NO_3)_3 \cdot 6H_2O$ (99.99%) were purchased from ALFA AESAR; methanol was purchased from VWR INTERNATIONAL; and polished MgO (100) substrates (10×10×0.5 mm) were purchased from MTI CORPORATION.

Precursor compositions were prepared by dissolving stoichiometric ratios of the La, Al, and Zr salts, and a 250% stoichiometric excess of the Li salt, for $Li_{6.25}Al_{0.25}La_3Zr_2O_{12}$ (Al-LLZO) at a concentration of 0.03 mole of per liter in methanol. The precursor composition was stirred overnight for over 6 hours to ensure complete dissolution of all salts.

A pipette was used to transfer the precursor composition on to the surface of a 1 cm×1 cm MgO substrate. A doctor blade was then applied to flatten the as-deposited precursor solution to provide an uneven coating having a thickness of 10 nanometers to 10 micrometers of the precursor composition on the MgO substrate.

The precursor composition coated MgO substrate was then refrigerated at 4.5° C. for 12 hours. During the refrigeration the solvent evaporated to provide a precursor film on the substrate. After the refrigeration, the coated MgO substrate was thermally equilibrated at 20° C. for 30 minutes prior to heat-treatment. The heat-treatment comprised heating at 630° C. in (atmosphere) for 15 minutes in flowing oxygen to provide the solid-state electrolyte.

Example 2. Preparation of $Li_{6.25}Al_{0.25}La_3Zr_2O_{12}$ on MgO, 710° C.

A solid-state electrolyte was prepared using the same method as in Example 1, except that the heat-treatment comprised heating at 710° C. for 15 minutes.

Example 3. Preparation of $Li_{6.25}Al_{0.25}La_3Zr_2O_{12}$ on MgO, 900° C.

A solid-state electrolyte was prepared using the same method as in Example 1, except that the heat-treatment comprised heating at 710° C. for 15 minutes.

Comparative Example 1

Figure 4A:
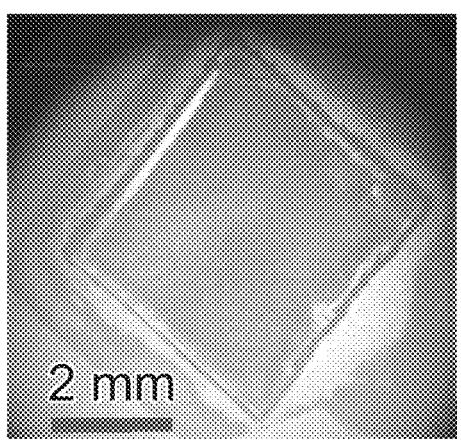
FIG. 4A is an optical photograph of a precursor film to Example 1.
Figure 4B:
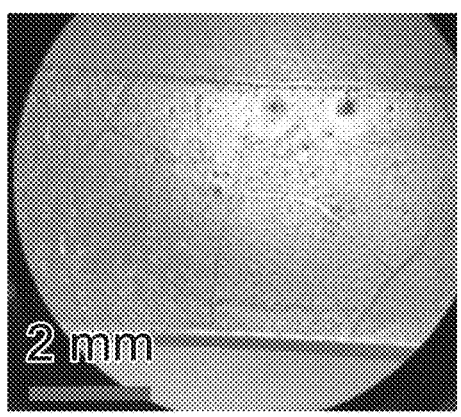
FIG. 4B is an optical photograph of a precursor film of Comparative Example 1.
Figure 5:
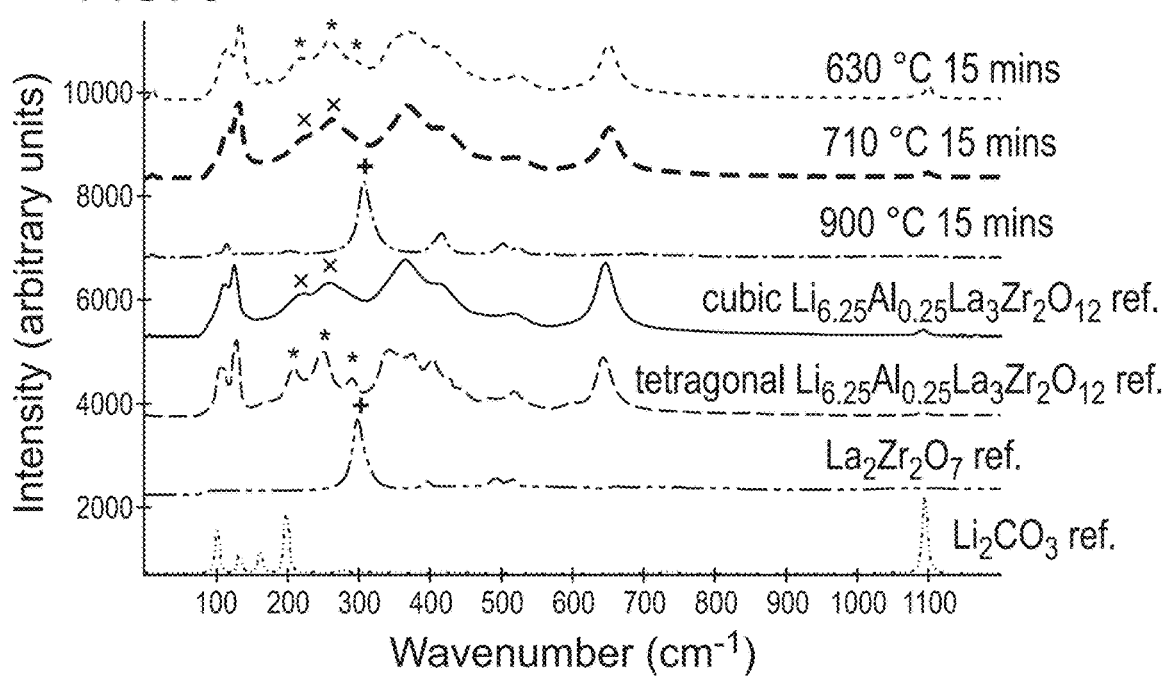
FIG. 5 is a graph of intensity (arbitrary units) versus wavenumber (an inverse centimeters, cm') showing the results of Raman analysis of Examples 1 to 3.

A precursor film was prepared using the same method as in Example 1, except that the precursor composition coated MgO substrate was prepared at 20° C. for 12 hours.
Optical Analysis of the Precursor Film Photographs of the precursor film of Example 1, and Comparative Example 1 are shown in FIGS. 4A and 4B, respectively. As shown in FIG. 4A, refrigerated drying provided a precursor film absent of defects, such as cracks or pinholes, whereas as shown in FIG. 4B, drying the film at room temperature (20° C.) resulted in a film having numerous defects. While not wanting to be bound by theory, is understood that the reduced solvent evaporation rate in the refrigerator avoided the cracks that are observed in the precursor film of Comparative Example 1. Also, tensile stresses can be generated in the deposited film due to thermal contraction. Because the deposited film is not completely dried in the refrigerated drying of Example 1, the tensile stresses can be quickly self-relieved by the motion of solvent molecules and dissolved ions, and, therefore, no cracks are formed due to thermal contraction.
Raman Analysis The solid-state electrolytes of Examples 1, 2, and 3 were evaluated by Raman analysis, the results of which are shown in FIG. 5, using a WITec instrument with a spectral resolution of 0.7 cm$^{-1}$ at 10 mW and a wavelength of 532 nm to ensure low penetration depths. Also shown in FIG. 5 are Raman spectra for cubic $Li_{6.25}Al_{0.25}La_3Zr_2O_{12}$, tetragonal $Li_{6.25}Al_{0.25}La_3Zr_2O_{12}$, $La_2Zr_2O_7$, and $Li_2CO_3$. The film of Example 1 annealed at 630° C. shows a mix of tetragonal and cubic phases with some cubic phase characteristics between 350 and 450 cm$^{-1}$, which can correspond to Li—O vibrations. Increasing the annealing temperature in Example 2 to 710° C. resulted in a pure cubic phase, confirmed by oxygen bending between 200 and 300 cm$^{-1}$ and Li—O vibrations mode between 300 and 600 cm$^{-1}$. However, further increasing the annealing temperature to 900° C. as in Example 3 led to $La_2Zr_2O_7$ phase formation, demonstrated by a strong peak appearing at 299 cm$^{-1}$ which corresponds to an $F_{2g}$ vibrational mode. These results indicate that after the complete decomposition of the precursors, a two-step phase transformation, tetragonal Al-LLZO to cubic Al-LLZO to de-lithiated $La_2Zr_2O_7$, proceeds with increasing annealing temperature. The lithium content in the film decreases significantly between 710° C. and 900° C., which is also consistent with the in situ Raman results discussed below.

Example 4: In-Situ Raman Analysis

Figure 6A:
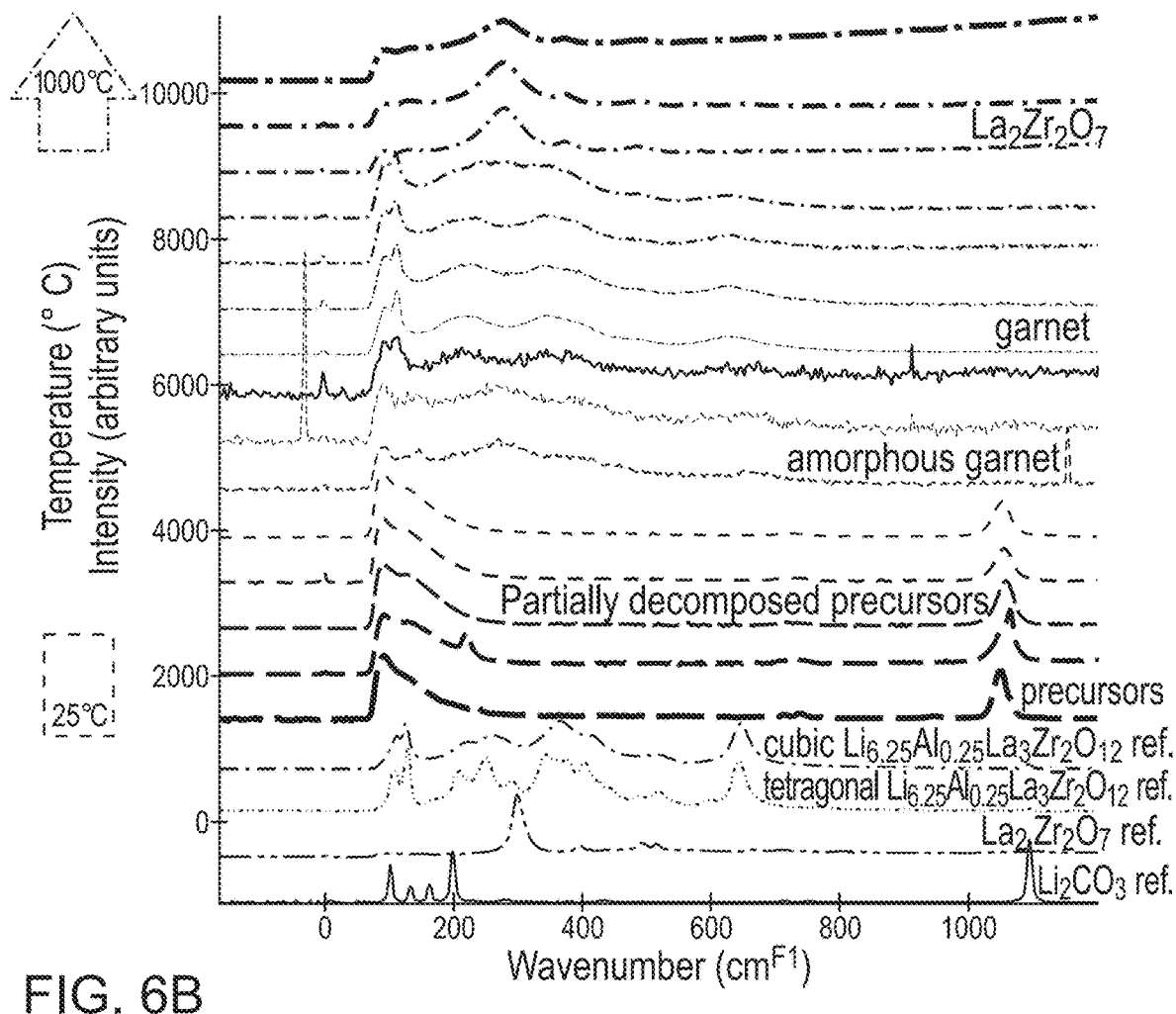
FIG. 6A is a graph of temperature (° C.) and intensity (arbitrary units) versus wavenumber ($cm^{-1}$) showing the results of in-situ Raman analysis of Example 4.
Figure 6B:
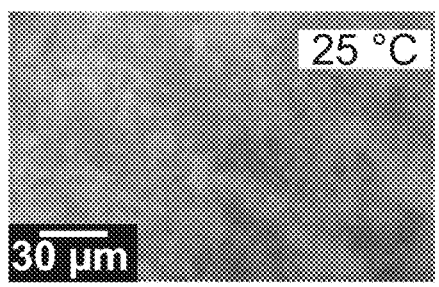
FIG. 6B is an optical photograph of the surface of the solid-cell electrolyte at 25° C. in Example 4.
Figure 6C:
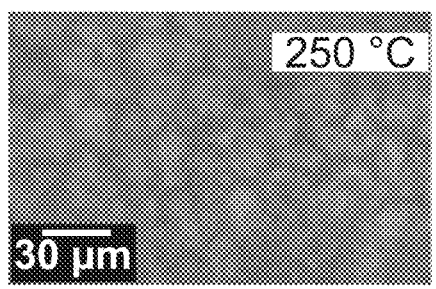
FIG. 6C is an optical photograph of the surface of the solid-cell electrolyte at 250° C. in Example 4.
Figure 6D:
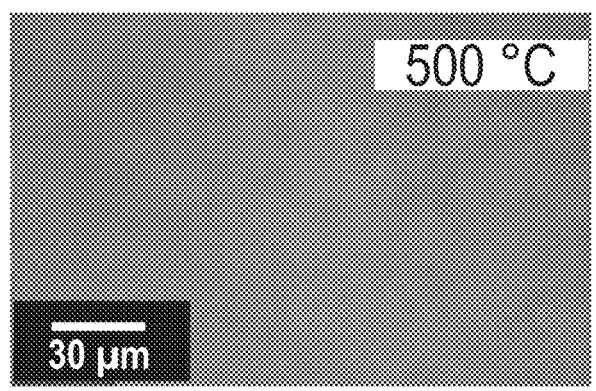
FIG. 6D is an optical photograph of the surface of the solid-cell electrolyte at 500° C. in Example 4.
Figure 6E:
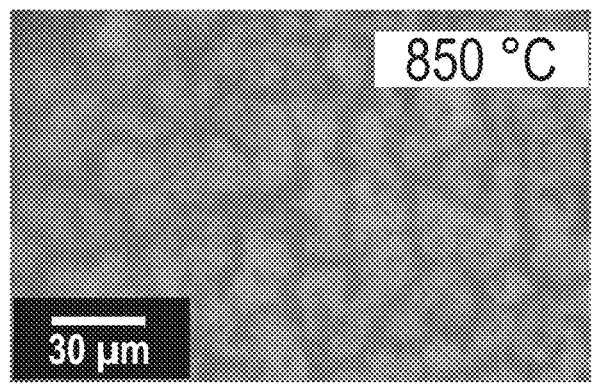
FIG. 6E is an optical photograph of the surface of the solid-cell electrolyte at 850° C. in Example 4.

The formation of the solid-state electrolyte was observed by in-situ Raman analysis. The synthesis was the same as Example 1, a 250% excess of $LiNO_3$ was used (corresponding to a lithium stoichiometry of $Li_{22}$ to accommodate $LiNO_3$ loss by sublimation) to provide $Li_{6.25}Al_{0.25}La_3Zr_2O_{12}$. In the in-situ Raman analysis the precursor film was heated at a ramp rate of 10° C./min and the Raman measurements conducted while holding the film isothermally at 15 different temperatures between 25° C. to 1000° C. Shown in FIG. 6A are referenced spectra for $Li_2CO_3$, $La_2Zr_2O_7$, tetragonal $Li_{6.25}Al_{0.25}La_3Zr_2O_{12}$, cubic $Li_{6.25}Al_{0.25}La_3Zr_2O_{12}$ reference, and 15 measurements at temperatures of 25° C., 200° C., 250° C., 300° C., 400° C., 500° C., 550° C., 600° C., 650° C., 700° C., 750° C., 800° C., 850° C., 900° C., and 1000° C., respectively. Also, shown in FIGS. 6B, 6C, 6D, and 6E are optical photographs taken at 25° C., 250° C., 500° C., and 800° C., respectively.

From 25° C. to 400° C., the Raman spectra do not have significant shifts or changes, and from 500° C. to 600° C., Raman peaks are extremely noisy. These results are consistent with the optical images, which show that the morphology of the film drastically can change from crystalline to amorphous at 500° C., and a different crystalline morphology can gradually appear at elevated temperatures. These results can indicate that complete precursor decomposition happens at approximately 500° C. At this temperature, an amorphous garnet phase is formed, and a recrystallization begins at 500 to 600° C.

Above 650° C., Raman peaks begin to appear and garnet-like Raman spectra are observed between 650° C. and 750° C. However, since there is significant atomic vibration at high temperatures, cubic and tetragonal phases can be difficult to differentiate by in situ Raman results obtained at elevated temperatures.

Above 800° C., the $La_2Zr_2O_7$ peak at 300 $cm^{-1}$ becomes significant, and peaks corresponding to garnet phases gradually disappear. This phase transition is related to lithium evaporation at high temperatures. To exclude the high-temperature thermal vibration effects on the Raman spectra, an ex situ experiment can be performed at 900° C. to confirm the $La_2Zr_2O_7$ phase formation. The optical microscopy images of FIGS. 6B to 6E collected at different temperatures show a "crystalline to amorphous to crystalline" transition at approximately 500° C., which is consistent with the noisy Raman curves between 500 to 600° C.

SEM Analysis

Figure 7A:
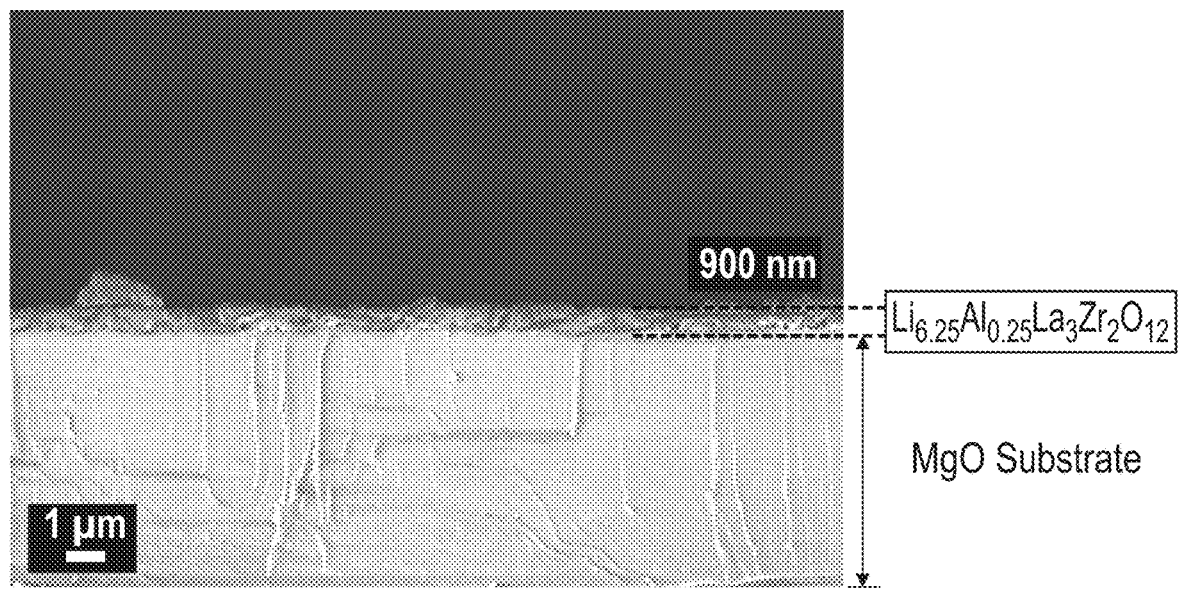
FIG. 7A is a SEM image of a cross-section of the solid-state electrolyte of Example 2.
Figure 7B:
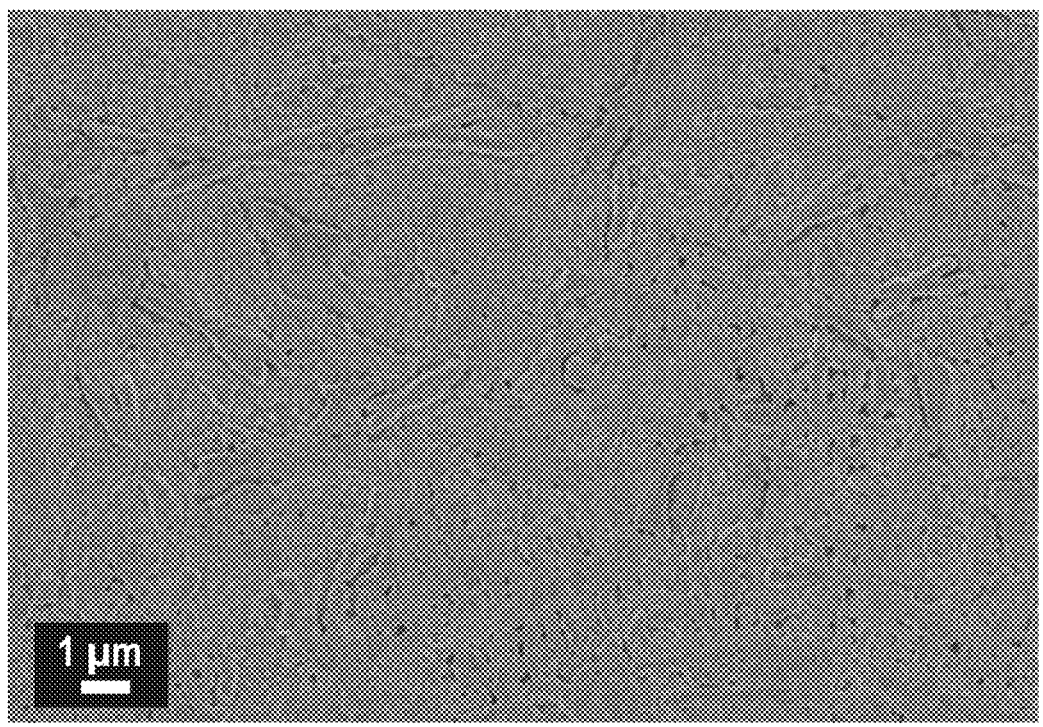
FIG. 7B is a SEM image of the surface of the solid-state electrolyte of Example 2.

Scanning electron microscopy (SEM) images were collected on a ZEISS Supra55VP field emission scanning electron microscope operated between 3.0 to 10.0 kV using both the in-lens secondary electron (SE) and the Everhart-Thornley SE detectors. Samples were cross sectioned with a diamond blade and attached to sample stage with carbon-conductive tape. The results of the SEM analysis of the solid-state electrolyte of Example 2 (710° C.) are shown in FIGS. 7A and 7B. As shown in FIG. 7A, on the MgO substrate is a 900 nanometer (nm) layer of $Li_{6.25}Al_{0.25}La_3Zr_2O_{12}$. As shown in FIG. 7B, few if any defects are observed.

X-Ray Photoelectron Analysis

X-ray photoelectron spectroscopy (XPS) for N1s was performed using a THERMO K-Alpha XPS system with a spot size of 400 µm and a resolution of 0.1 eV.

Figure 8A:
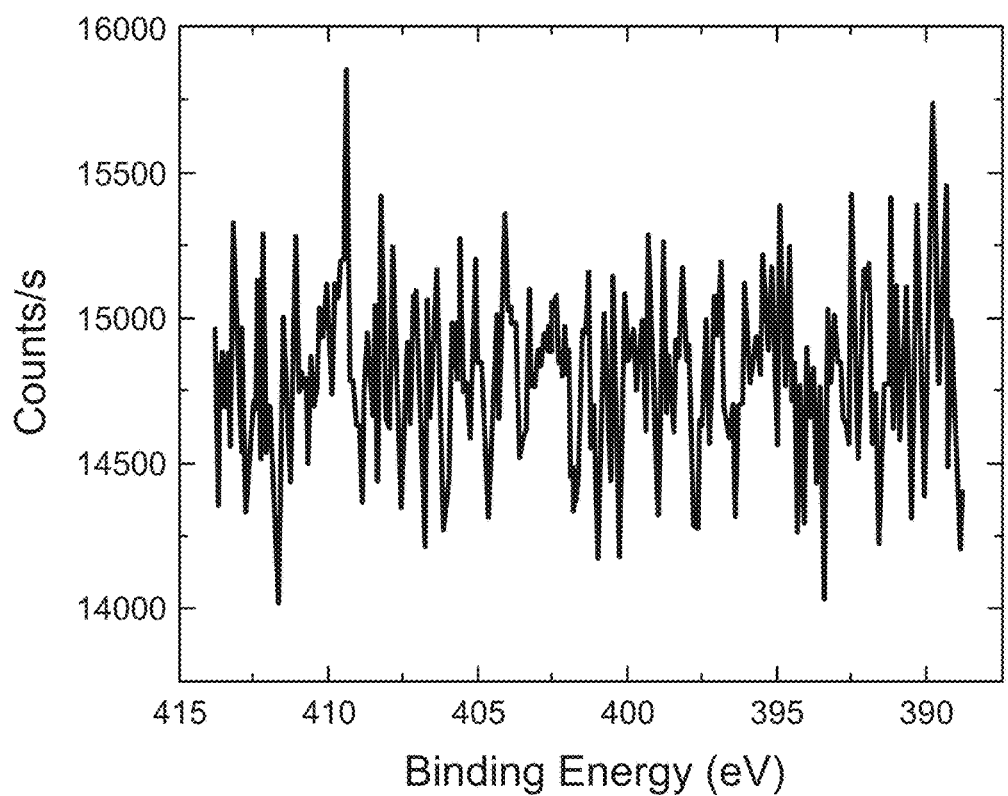
FIG. 8A is a graph of counts per second versus binding energy (electron volts, eV) showing the results of XPS analysis of the solid-state electrolyte of Example 1.
Figure 8B:
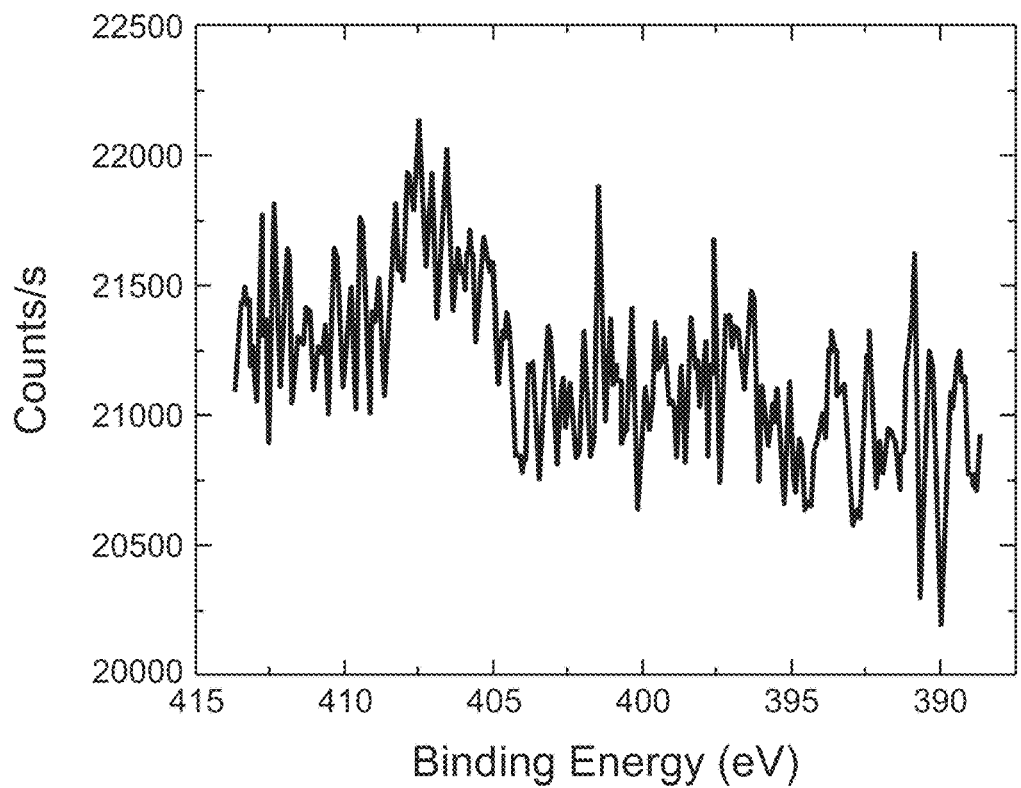
FIG. 8B is a graph of counts per second versus binding energy (electron volts, eV) showing the results of XPS analysis of the solid-state electrolyte of Example 2.
Figure 8C:
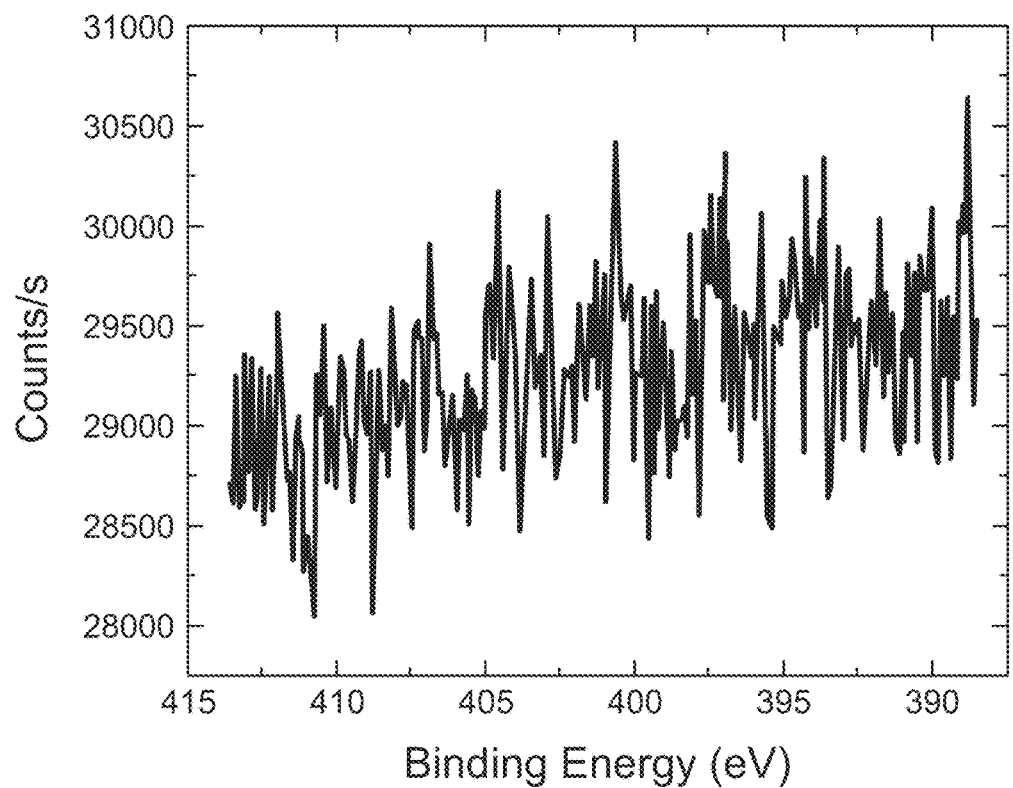
FIG. 8C is a graph of counts per second versus binding energy (electron volts, eV) showing the results of XPS analysis of the solid-state electrolyte of Example 3.
Figure 8D:
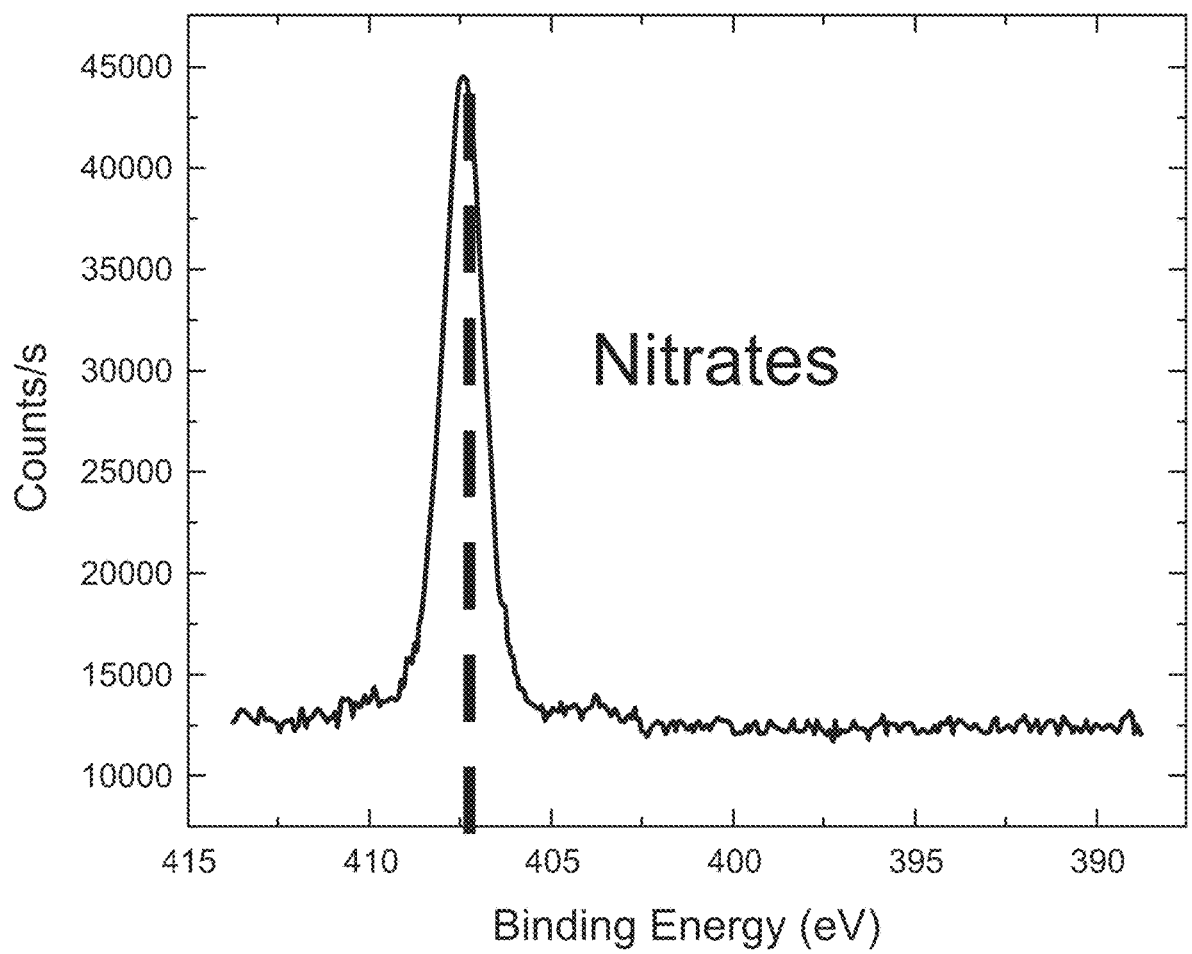
FIG. 8D is a graph of counts per second versus binding energy (electron volts, eV) showing the results of XPS analysis of the precursor film of Example 1.

Shown in FIG. 8A to 8C are XPS results for Examples 1 to 3, and, for reference, shown in FIG. 8D is the results of analysis of the precursor composition showing a N1s peak from the nitrates. From the XPS results, nitrogen is observed to be present in the precursor film but not in the solid-state electrolyte of Examples 1 to 3. While not wanting to be bound by theory, it is understood that these results indicate complete decomposition of the precursors after annealing e.g., above 630° C., to provide Al-LLZO films comprising a mixture of cubic, tetragonal, and amorphous phases.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substituted" means that the compound is substituted with at least one (e.g., 1, 2, 3, or 4) substituent, and the substituents are independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid (—C(=O)OH), a carboxylic C1 to C6 alkyl ester (—C(=O)OR wherein R is a C1 to C6 alkyl group), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of manufacturing a solid-state electrolyte, the method comprising:
   providing a substrate;
   providing a precursor composition comprising a compound comprising lithium, a compound comprising lanthanum, a compound comprising zirconium, and a solvent comprising a C1 to C6 alcohol;
   disposing the precursor composition on the substrate to provide a coated substrate;
   treating the coated substrate at a temperature between −30° C. and 15° C. to form a precursor film on the substrate, wherein a content of the solvent in the precursor film is 0.001 to 20 weight percent, based on a total weight of the precursor film; and
   heat-treating the precursor film at a temperature of 500° C. to 1000° C. to manufacture the solid-state electrolyte,
   wherein the solid-state electrolyte comprises Li$_{(7-x)}$Al$_{x/3}$La$_3$Zr$_2$O$_{12}$ wherein 0≤x≤1, and
   wherein the solid-state electrolyte is in the form of a film having a thickness of 5 nanometers to 1000 micrometers.

2. The method of claim 1, wherein the substrate comprises, an aluminum oxide comprising iron, titanium, chromium, copper, magnesium, or a combination thereof, MgO, Al$_2$O$_3$, SiO$_2$, indium tin oxide, zinc oxide, indium tin zinc oxide, SiC, Ti, Ni, stainless steel, or combination thereof.

3. The method of claim 1, wherein a content of the compound comprising lithium in the precursor composition is a stoichiometric excess for the Li$_{(7-x)}$Al$_{x/3}$La$_3$Zr$_2$O$_{12}$ wherein 0≤x≤1.

4. The method of claim 3, wherein the stoichiometric excess is 100% to 400%.

5. The method of claim 1, wherein the precursor composition further comprises a compound comprising aluminum.

6. The method of claim 1, wherein the treating of the coated substrate comprises treating at 0° C. to 10° C.

7. The method of claim 1, wherein a content of the solvent in the precursor film is 0.01 to 5 weight percent, based on a total weight of the precursor film.

8. The method of claim 1, wherein the heat-treating is at a temperature of 700° C. to 800° C.

9. The method of claim 1, wherein the heat treating comprises heat treating in a gas having oxygen content of 20 volume percent to 100 volume percent, based on a total volume of the gas.

10. The method of claim 1, wherein the Li$_{(7-x)}$Al$_{x/3}$La$_3$Zr$_2$O$_{12}$ comprises cubic Li$_{(7-x)}$Al$_{x/3}$La$_3$Zr$_2$O$_{12}$, and wherein a content of the cubic Li$_{(7-x)}$Al$_{x/3}$La$_3$Zr$_2$O$_{12}$ is 50 to 100 weight percent, based on a total weight of the solid-state electrolyte.

11. The method of claim 1, wherein the solid-state electrolyte has a surface roughness of 1 nanometer to 100 micrometers Ra.

12. A lithium battery comprising the solid-state electrolyte of claim 1 in at least one of a positive electrode, a separator, or a negative electrode.

13. A lithium battery comprising the solid state electrolyte of claim 10 between a positive electrode and a negative electrode.

14. A solid state electrolyte comprising Li$_{(7-x)}$Al$_{x/3}$La$_3$Zr$_2$O$_{12}$ wherein 0≤x≤1, wherein the solid state electrolyte is in a form of a film having a thickness of 5 nanometers to 1000 micrometers, wherein the film has been treated at a temperature between −30° C. and 15° C. forming a precursor film comprising 0.001 to 20 weight percent of a solvent comprising a C1 to C6 alcohol, based on a total weight of the precursor film, and wherein a defect content of the film is 0 to 20 percent, based on a total area of the film.

15. The solid state electrolyte of claim 14, wherein the Li$_{(7-x)}$Al$_{x/3}$La$_3$Zr$_2$O$_{12}$ has a cubic crystal structure, and wherein a content of the Li$_{(7-x)}$Al$_{x/3}$La$_3$Zr$_2$O$_{12}$ is 50 to 100 weight percent, based on a total weight of the solid state electrolyte.

16. The method of claim 1, wherein the treating of the coated substrate comprises treating at a temperature between −10° C. and 10° C., and the method further comprises treating the precursor film at a temperature of greater than 10° C. to 20° C. to thermally equilibrate the precursor film.

* * * * *